United States Patent [19]

Tanahashi

[11] Patent Number: 4,905,646
[45] Date of Patent: * Mar. 6, 1990

[54] TWO-STROKE INTERNAL COMBUSTION ENGINE WITH CYLINDER HEAD VALVES

[75] Inventor: Toshio Tanahashi, Susono, Japan

[73] Assignee: Toyota Jidosha Kabushiki Kaisha, Toyota, Japan

[*] Notice: The portion of the term of this patent subsequent to Mar. 22, 2005 has been disclaimed.

[21] Appl. No.: 139,741

[22] Filed: Dec. 30, 1987

[30] Foreign Application Priority Data

Jan. 13, 1987 [JP] Japan .................. 62-4171

[51] Int. Cl.$^4$ .............................. F02B 75/02
[52] U.S. Cl. .................. 123/295; 123/52 M; 123/65 E; 123/315; 123/569
[58] Field of Search ........... 123/65 R, 65 PE, 65 E, 123/52 M, 52 MB, 294, 295, 302, 315, 569

[56] References Cited

U.S. PATENT DOCUMENTS

| | | | |
|---|---|---|---|
| 2,958,315 | 11/1960 | Williams | 123/65 VC |
| 3,808,807 | 5/1974 | Lanpheer | 60/313 |
| 4,068,630 | 1/1978 | Bennett et al. | 123/315 |
| 4,162,662 | 7/1979 | Melchoir | 123/188 M |
| 4,224,905 | 9/1980 | von Seggern et al. | 123/301 |
| 4,318,373 | 3/1982 | Soubis | 123/568 |
| 4,327,676 | 5/1982 | McIntire et al. | 123/90.6 |
| 4,333,428 | 6/1982 | Tanaka et al. | 123/568 |
| 4,357,917 | 11/1982 | Aoyama | 123/90.16 |
| 4,523,560 | 6/1985 | Motosugi et al. | 123/308 |
| 4,543,928 | 10/1985 | von Seggern | 123/262 |
| 4,548,175 | 10/1985 | Kawai et al. | 123/308 |
| 4,580,533 | 4/1986 | Oda et al. | 123/90.16 |
| 4,616,605 | 10/1986 | Kline | 123/65 VD |
| 4,682,576 | 7/1987 | Nakamura et al. | 123/52 MF |
| 4,700,681 | 10/1987 | Hanafusa et al. | 123/478 |
| 4,732,116 | 3/1988 | Tanahashi et al. | 123/65 BA |
| 4,732,117 | 3/1988 | Tanahashi et al. | 123/65 PE |
| 4,732,118 | 3/1988 | Tanahashi et al. | 123/65 VD |
| 4,732,124 | 3/1988 | Nakamura et al. | 123/302 |
| 4,735,178 | 4/1988 | Inoue et al. | 123/52 M |

FOREIGN PATENT DOCUMENTS

| | | | |
|---|---|---|---|
| 48-51126 | 7/1973 | Japan . | |
| 53-27731 | 3/1978 | Japan . | |
| 068520 | 4/1984 | Japan | 181/240 |
| 59-22250 | 7/1984 | Japan . | |
| 60-5770 | 2/1985 | Japan . | |
| 0164608 | 8/1985 | Japan | 123/90.16 |
| 0247006 | 12/1985 | Japan | 60/313 |
| 61-167129 | 7/1986 | Japan . | |
| 61-201818 | 9/1986 | Japan . | |

*Primary Examiner*—Craig R. Feinberg
*Attorney, Agent, or Firm*—Oliff & Berridge

[57] ABSTRACT

A two-stroke internal combustion engine comprising a cylinder head 14 having intake valves 20 and exhaust valves 22 arranged therein. A supercharger 42 is arranged in an intake pipe 44 and a tank 46 is mounted downstream of the supercharger 42. A valve 48 is arranged in an opening between the tank 46 and the pipe 44. From the pipe b 44, two intake manifolds 30 and 32 are branched, with respective branch pipes connected to the respective intake ports 24. An intake control valve 50 is arranged in one of the manifold 32, which closes at idling and under a low load of the engine. The engine further has means for generating a swirl S about an axis of the combustion chamber 18 by a portion of exhaust gas caused to flow back from the exhaust port 26 into the combustion chamber 18 after being once exhausted through the exhaust port when the exhaust valve is open.

17 Claims, 4 Drawing Sheets

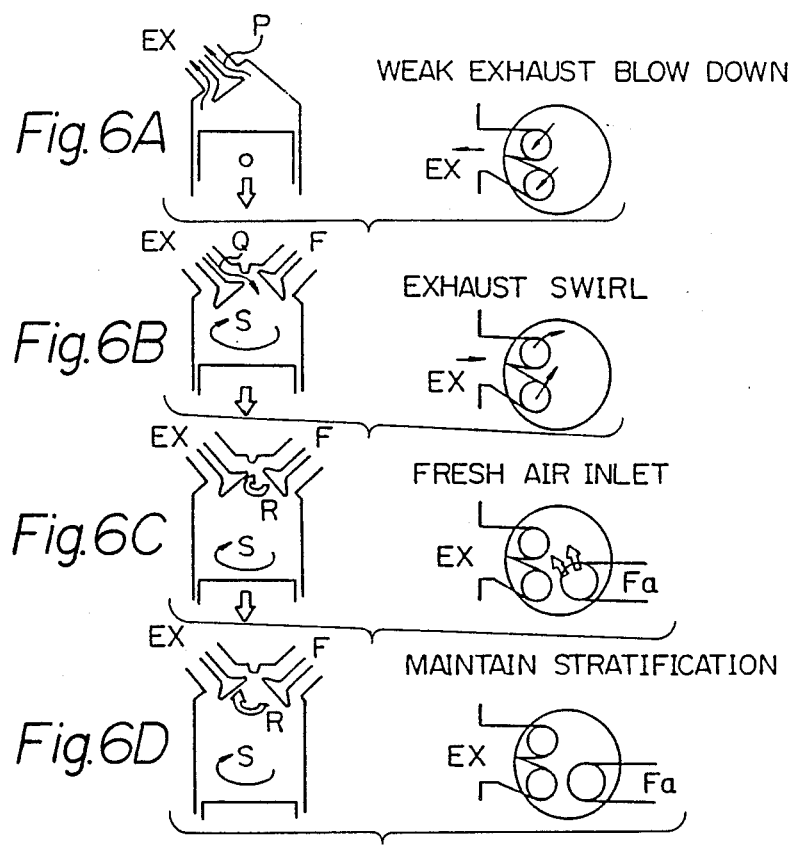

TWO-STROKE INTERNAL COMBUSTION ENGINE WITH CYLINDER HEAD VALVES

BACKGROUND OF THE INVENTION

1. Field of the Invention

The present invention relates to a two-stroke internal combustion engine in which an intake valve and an exhaust valve are arranged in a cylinder head.

2. Description of the Related Art

Japanese Examined Patent Publication (Kokoku) No. 60-5770 discloses an open-chamber type two-stroke internal combustion engine with an intake valve and an exhaust valve. In this two-stroke engine, the intake valve and the exhaust valve open simultaneously when the piston moves to the bottom dead center, to carry out a scavenging action; namely, fresh air entering from the intake valve into the combustion chamber first flows downwardly along the vertical wall portion of the combustion chamber, and is then reflected at the top of the piston to move upwardly along the opposite vertical wall portion, to describe a vertical U-shaped course, and thus the location of an interface between the fresh air and exhaust gas is changed, initially near the intake valve and is moved toward a lower central part of the combustion chamber and near the exhaust valve, and thus exhaust gas is displaced by fresh air in the entire combustion chamber.

This two-stroke engine may perform well under a high load, but suffers from a poor combustion at idling and under a partial load. In the two-stroke engine, a small amount of fresh air is supplied at idling and under a partial load so that a large amount of the burnt gas remains in the combustion chamber and is not exhausted, and a small amount of fresh air is spread widely among the unexhausted burned gas and is not collected near the spark plug. This especially applies to a two-stroke engine having the above stated vertical U-shaped flow, in which a substantial portion of the fresh air may move toward the lower portion of the combustion chamber and stay there Therefore, the initial burning by the spark plug provided on the cylinder head is hindered and/or the formation of a combustion flame core is prevented. Accordingly, due to the decrease in the speed of transmission of the flame, a misfire or insufficient combustion may occur.

It is conventionally known in the art to generate a swirl about an axis of the combustion chamber. For example, U.S. Pat. No. 4,543,928 discloses a two-stroke engine in which two intake valves are arranged at opposite sides to cause a swirl about the cylinder axis of intake air. An exhaust valve in this engine is arranged in a subcombustion chamber provided centrally at the top of the combustion chamber. In this engine, combustion is initiated at the subcombustion chamber and then spread to the main combustion chamber in which a swirl is generated. This is far from the inventive idea to which the present invention is directed, in which a swirl is generated by a flow back of exhaust gas and/or stratification is established between the supplied fresh air and the remaining burned gas in the combustion chamber.

As exemplified above, conventional two-stroke internal combustion engines generally suffer from a problem of a poor combustion at idling and under a partial load, since the exhaust action in two-stroke internal combustion engines is carried out together with intake action, to effect a scavenging action, so that a considerable amount of burned gas remains in the combustion chamber and the ratio of supplied fresh air to the remaining burned gas becomes low, and thus the combustion becomes unstable.

SUMMARY OF THE INVENTION

An object of the present invention is to provide a two-stroke internal combustion engine having a cylinder head with at least one intake port and at least one exhaust port arranged therein, which can solve the above stated problems by establishing a stratification between supplied fresh air and remaining burned gas to allow fresh air to collect near the cylinder head, especially at idling and under a partial load to facilitate the initial burning and achieve a stable combustion.

According to the present invention, there is provided a two-stroke internal combustion engine comprising a cylinder block and a cylinder head mounted thereon to form combustion chamber therein, the cylinder head having at least one intake port and at least one exhaust port formed therein, with an intake valve and an exhaust valve arranged in the at least one intake port and the at least one exhaust port, respectively, for synchronous operation with the engine to open and close the respective port, and a fresh air intake passage means having an air charging means arranged therein for delivering fresh air under pressure to the at least one intake port. According to the present invention, the engine further comprises means for generating a swirl about an axis of the combustion chamber by a portion of the exhaust gas, that flows back from the at least one exhaust port into the combustion chamber after being once exhausted through the at least one exhaust port when the exhaust valve opens, and a tank means having a connection passage in communication with the fresh air intake passage means at a position downstream of the charging means. A valve means is arranged such that the connection passage is closed when the engine is under a relatively high load.

With this arrangement, stratification between the fresh air and remaining burned gas can be established, at least at idling and under a partial load, as follows.

The exhaust valve opens while the piston is moving downward and the burned gas is blown down from the combustion chamber into the exhaust port. The blow down pressure at idling or under a partial load may be relatively low, but a positive pressure prevails in the exhaust port. The blow down period is short but the piston still continues to move downward, causing a reduction in the pressure in the combustion chamber. When the pressure in the combustion chamber becomes lower than that in the exhaust port, a back flow or reverse flow occurs of a portion of the exhaust gas that was once exhausted or blown down when the exhaust valve was opened.

The means for generating a swirl about an axis of the combustion chamber according to the present invention acts on this exhaust gas back flow to make the exhaust gas cause a swirl in the combustion chamber. Thereafter, the intake valve opens and fresh air flows into the combustion chamber relatively slowly, since a relatively small amount of fresh air is supplied at idling or under a partial load, and this slow flow of fresh air is superimposed on the swirling exhaust gas and collected near the cylinder head.

Further, according to the present invention, a tank means having a connection passage in communication with the fresh air intake passage means at a position downstream of the charging means is provided. This tank contains a predetermined volume which absorbs pulsations in the flow of fresh air output from the charging means, which, preferably, is a mechanical displacement pump, when the valve means arranged in the connection passage opens at idling or under a partial load to thereby supply a stable, nonfluctuating flow of fresh air into the combustion chamber so that the exhaust gas swirl formed in the combustion chamber is not disturbed by this flow of fresh air. Accordingly, a good stratification of the fresh air superimposed on the swirling exhaust gas can be realizing. This valve means closes when the load of the engine becomes relatively high, to shut off the tank means from the fresh air intake passage means and avoid an unnecessary increase in the pressure in the tank means, to thereby ensure a prompt response to a need to supply charged fresh air into the combustion chamber.

Preferably, the at least one intake port comprises first and second intake ports which preferably extend from one side of the engine in a side by side relationship, and the at least one exhaust port comprises first and second exhaust ports, preferably extending from the opposite side of the engine. Preferably, the first exhaust port extends opposite to the second intake port and the second exhaust port extends opposite to the first intake port, the second exhaust port merging with the first exhaust port at a predetermined angle.

Preferably, the fresh air intake passage means comprises a first intake passage and a second intake passage for connection to the first and second intake ports, respectively, the first and a second intake passage being connected to a common upstream intake passage, and the charging means and the tank connection passage being arranged in the common upstream intake passage. An intake control valve is preferably arranged in the second intake port for operation in response to the load of the engine, in such a manner that the port is closed when the load of the engine is lower than a predetermined value and is open when the load is higher than the predetermined value. The first exhaust port is preferably connected to an exhaust pipe in a generally linear relationship with the second exhaust port extending at a predetermined angle, whereby the portion of exhaust gas that flows back into the combustion chamber when the exhaust valve opens primarily flows through the first exhaust port, by inertia, and generates the swirl in the combustion chamber, and a counterflow from the second intake port is obstructed by the intake control valve when the load of the engine is lower than the predetermined value.

Preferably, the cylinder head has an inner wall having masking means provided at least partially around the at least one exhaust port, to generate the swirl in the combustion chamber when a portion of the exhaust gas flows back into the combustion chamber.

Preferably, a throttle valve is arranged upstream of the charging means, which preferably comprises a Roots type blower.

BRIEF DESCRIPTION OF THE DRAWINGS

The present invention will become more apparent from the following description of the preferred embodiment with reference to the accompanying drawings, in which:

FIG. 6(A-B) are explanatory view of the back flow of exhaust gas and the flow of fresh air.

DESCRIPTION OF THE PREFERRED EMBODIMENTS

Figure 1:
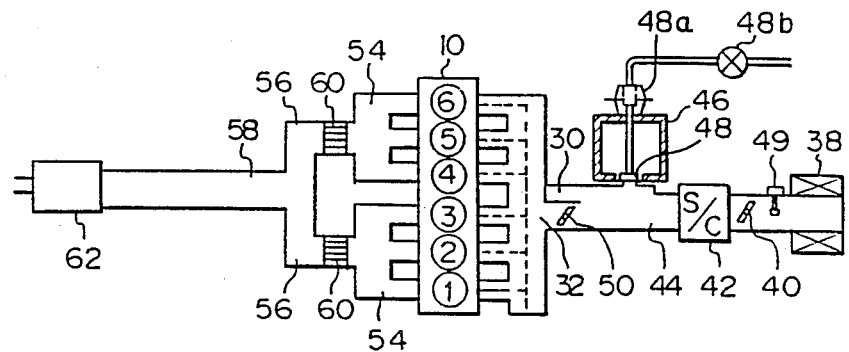
FIG. 1 is a diagrammatic view of a two-stroke internal combustion engine having six cylinders according to the present invention.
Figure 2:
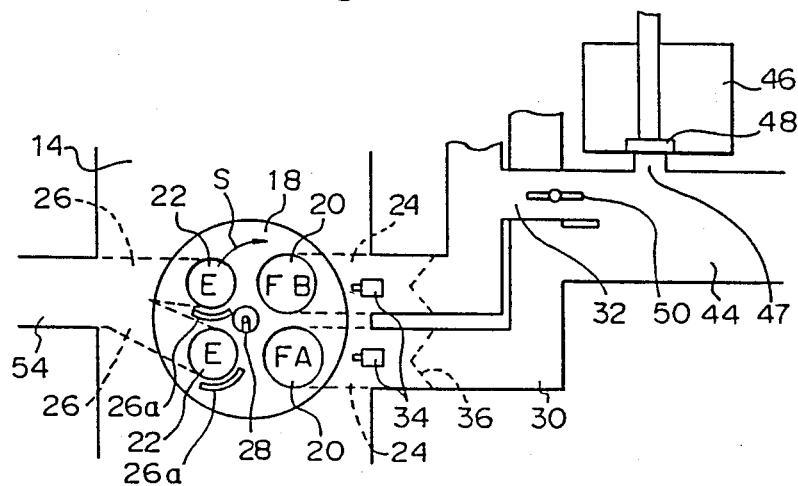
FIG. 2 is a view showing in more detail one of the cylinders in FIG. 1, and more specifically, showing an arrangement of the combustion chamber.
Figure 3:
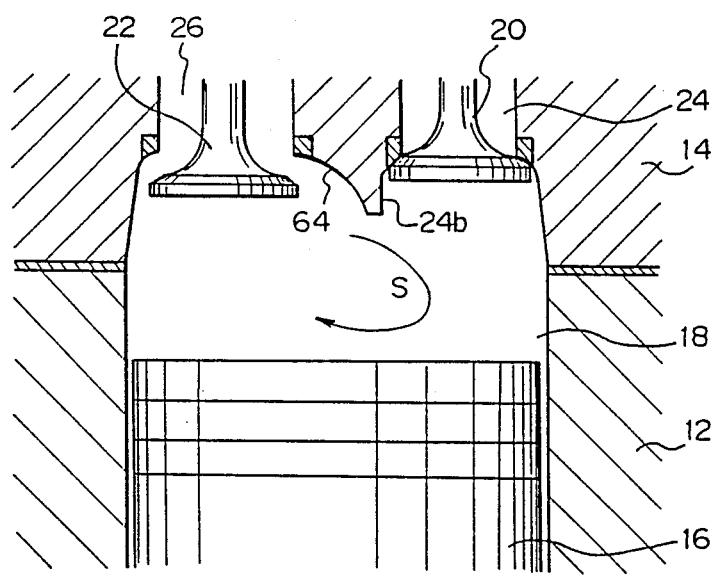
FIG. 3 is a vertical section view of the cylinder of FIG. 2.

Referring to FIGS. 1 to 3, the two-stroke internal combustion engine according to the present invention comprises an engine body 10, as represented in FIG. 1, which comprises, as represented in FIG. 3, a cylinder block 12 having a cylinder bore and a cylinder head 14, and a piston 16 reciprocably arranged in the cylinder bore. A combustion chamber 18 is formed above the piston 16.

As shown in the FIG. 2, this two-stroke internal combustion engine has two intake valves 20 and two exhaust valves 22 arranged at the cylinder head 14, each constructed by a conventional poppet valve. Accordingly, two fresh air intake ports 24 and two exhaust ports 26 are provided at the cylinder head 14 to locate the intake valves 20 and exhaust valves 22, respectively, therein. A spark plug 28 is mounted centrally in the combustion chamber 18. Note, the two exhaust valves 22 are given the same symbol E, but one intake valve 20 is given the symbol FA and the other intake valve 20 is given the symbol FB. This means that the intake valves 20 have different functions. Namely, one of the intake valves 20, given the symbol FA, is hereinafter referred to as a first or low load intake valve and he other intake valve 20, given the symbol FB, is referred to as a second or high load intake valve. Also, one of the exhaust valves 22, opposing the second high load intake valve 20, is hereinafter referred to as a first exhaust valve and the other exhaust valve 22 is referred to as a second exhaust valve.

As shown in FIGS. 1 and 2, two intake manifolds 30 and 32 are mounted to the cylinder head 14. The intake manifold 30 is provided with branch pipes connected to the intake port 24 having the first low load intake valve (FA) 20, and the other intake manifold 32 is provided with branch pipes connected to the intake port 24 having the second high load intake valve (FB) 20. Fuel injection 34 are arranged in each of the intake ports 24 or in each of the branch pipes of the intake manifolds 30 and 32. Further, check valves 36, which are read valves, are arranged upstream of the fuel injectors 34, respectively.

As shown in FIG. 1, an air cleaner is provided at the upstream end of the fresh air passage to introduce fresh air, and a throttle valve 40 is provided for a manual control of the flow of intake fresh air, and a supercharger (S/C) 42 is provided to deliver fresh air under pressure. The supercharger 42 can be a mechanical displacement pump, preferably a Roots type blower, mechanically driven by the output of the engine.

The two intake ports 30 and 32 are connected to surge tanks or collecting portions of the branch pipes of the manifolds 30 and 32, respectively, and these collecting portions connected to the two intake ports 30 and 32 are commonly connected to a common intake pipe 44 in which the supercharger 42 is arranged.

As shown in FIGS. 1 and 2, a tank 46 is provided and has a connection passage or pipe opening 47 connected to the common intake pipe 44 at a position downstream of the supercharger 42. A tank control valve 48 is provided in the connection passage 47 to selectively open or close the passage 47. This tank control valve 48 can be any electrically operated valve, but in the illustrated embodiment, the tank control valve 48 is connected to a vacuum operated actuator 48a of the type conventionally used in the art and having a solenoid operated valve 48b for controlling the supply of the operating vacuum. This solenoid operated valve 48b can be electrically controlled by a control unit (not shown) in such a manner that the tank control valve 48 opens to allow the common intake pipe 44 to communicate with the tank 46 when the engine is idling or when the load of the engine is relatively low, and closes to shut off the common intake pipe 44 from the tank 46 when the load of the engine is relatively high. The tank 46 has a predetermined volume therein which, upon valve opening, serves to absorb any displacement and pulsation in the output by the supercharger 42 to suppress any fluctuation in the pressure. An air flow meter 49 is arranged upstream of the throttle valve 40.

A butterfly type intake control valve 50 is arranged in the collecting portion of the high load intake manifold 32. In contrast to the intake and exhaust valves 20 and 22, which are operated in synchronization with the crankshaft (not shown) of the engine, this intake control valve 50 is operated in response to the running condition of the engine, such as the load and the revolutional speed of the engine, as for the tank control valve 48. The intake control valve 50 is closed at least when the engine is idling or when the load of the engine is relatively low, so that fresh air passes only through the low load intake manifold 30. The intake control valve 50 is opened to allow a large amount of fresh air to pass through both of the intake manifolds 30 and 32 when the load of the engine is relatively high.

Figure 4A:
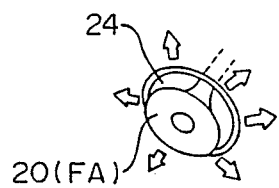
FIG. 4(A-B) are perspective view of the flow of fresh air from the intake valve into the combustion chamber.
Figure 4B:
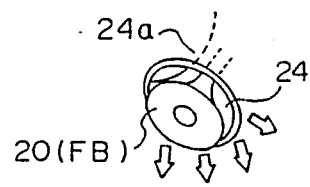

FIG. 4A and 4B perspective conceptual views of the characteristic features of the flow of fresh air flowing from the respective intake valves 20 FA and 20 FB into the combustion chamber 18. It should be understood that the characteristic features of the flow may not be obtained solely by the construction of the valve per se, and should be obtained by the characteristic of the arrangement of the intake ports 24 and the characteristic of the shape of the wall structure of the cylinder head 14 around the intake valves 20, even though the intake valves have the same shape.

As shown in of FIG. 4A, the low load intake valve 20 (FA) allows a small amount of fresh air to flow uniformly around the valve 20 (FA) and into the combustion chamber 18, as shown by the arrows. The high load intake valve 20 (FB) allows fresh air to flow into the combustion chamber 18 partially around the valve 20 (FB) in one direction, as shown by the arrows in FIG. 4B. This flow direction corresponds to the downward flow along the vertical inner wall surface of the cylinder bore, and thus a large amount of fresh air flowing through the high load intake port 24 during a high load moves first down and along the vertical inner wall surface of the cylinder bore on one side thereof, and then is deflected at the top of the piston 16 and moves upward along the vertical inner wall surface of the cylinder bore on the opposite side thereof, constituting a generally U-shaped flow course and efficiently displacing the burned gas in the combustion chamber 18. To ensure the above oriented flow of fresh air, it is possible, for example, to locate a deflecting wall member 24a on the port wall of the cylinder head 14, as shown in FIG. 4B, or to form a dam member 24b on the inner wall of the cylinder head 14, as shown in FIG. 3. However, it is possible to efficiently displace the burned gas with fresh air in the combustion chamber 18 according to the following features of the present invention, even if the wall structures around the low load and high load intake valves 20 (FA) and 20 (FB) are similar.

As shown in FIG. 2, the two intake ports 24 extend from one side of the engine in a side by side relationship, and the two exhaust ports 26 extend from the opposite side of the engine, with the first exhaust port 26 having the first exhaust valve 22, described previously, extending opposite to the second high load intake port 24 and the second exhaust port 26 merging into the first exhaust port 26 within the cylinder head 14 at a predetermined angle.

As shown in FIG. 1, the exhaust system is divided into two blocks, in view of the sparking order, to avoid exhaust interference between two consecutive combustion cylinders, and thus two exhaust manifolds 54 are connected to the exhaust ports 26 of three cylinders, respectively. The two exhaust manifolds 54 have collecting portions 56 which are connected to a common exhaust pipe 58 and then to a muffler 62. Catalysers 60 are arranged in the collecting portions 56, respectively.

The action of the exhaust or burned gas is now described. The burned gas is blown down from the combustion chamber 18 into the exhaust ports 26 just after the exhaust valves 22 open. The blow down pressure at idling or under a partial load may be relatively low, but a positive pressure prevails in the exhaust ports 26 and the pressure in the combustion chamber 18 is suddenly decreased. The pressure in the combustion chamber 19 then becomes lower than that in the exhaust ports 26 during the downward movement of the piston 16, so that a portion of that exhaust gas that has been once exhausted or blown down is made to flow back into the combustion chamber 18, due to this pressure difference.

In this way, a back flow of once exhausted gas into the combustion chamber 18 occurs just after the relatively weak exhaust blow down. According to the present invention, this back flow of exhaust gas into the combustion chamber 18 generates a swirl in the combustion chamber 18 about an axis of the cylinder, as represented by the mark S in FIGS. 2 and 3. Note, although there are many proposals in the art to generate a swirl of the intake air flowing through the intake port, a fundamental feature of the present invention is to generate a swirl in the back flow of exhaust gas. To generate this swirl in the back flow of exhaust gas, an appropriate means can be adopted, similarly to the generation of a swirl of intake air. In this illustrated embodiment, a mask wall 26a is provided on the inner wall of the cylinder head 14 to partly enclose an opening area of each of the exhaust ports 26, as shown in FIG. 2, and a slope 64 is provided, as shown in FIG. 3, for example, gently tapering from the opening area of the first exhaust port 26 to the second high load intake port 24 and merging with the projecting edge of the dam member 24b for the intake port 24. It will be understood that this slope 64 cooperates with the dam member 24b in the formation of the swirl S and to prevent fresh air from flowing in the direction reverse to the arrow S, thereby allowing the formation of a more concrete swirl S in the combustion chamber 18.

Further, it will be understood that the arrangement of the exhaust ports 26 and the intake ports 24 also allows the formation of the swirl S, especially when the intake control valve 50 is closed at idling and under a low load, since the first exhaust port 26 is connected to a branch pipe of the exhaust manifold 54 in a generally straight linear relationship and the back flow of exhaust gas will primarily be passed through the first exhaust port 26 by the inertia thereof, rather than passing through the second curved exhaust port.

Figure 5:
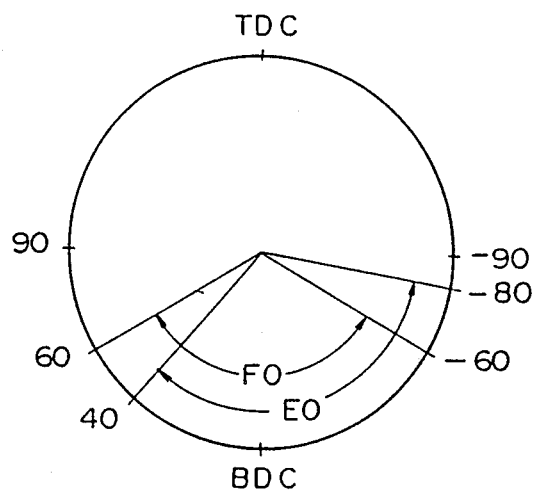
FIG. 5 shows the valve operation timings.

FIG. 5 shows the operating timing of the intake valves 20 and the exhaust valves 22, driven synchronously to the crankshaft of the engine. The opening time of the intake valves 20 is represented by the symbol OF and the opening time of the exhaust valves 22 is represented by the symbol EO. As is known in the art, the two-stroke engine effects only two strokes, namely, an expansion stroke in which the piston 16 moves downward from the top dead center (TDC) to the bottom dead center (BDC), and a compression stroke in which the piston 16 moves upward from the bottom dead center (BDC) to the top dead center (TDC). The intake and the exhaust operations are carried out near the bottom dead center (BDC) of these two strokes, and inherently include a scavenging action in which fresh air forcibly supplied under pressure by the supercharger 42 replaces the burned gas in the combustion chamber 18. There is little problem in achieving a combustion in such a two-stroke engine under a high load, since a large amount of fresh air is supplied to the combustion chamber 18 together with a correspondingly large amount of fuel, with a result that less burned gas remains in the combustion chamber 18. However, as discussed previously, the supply of fresh air and fuel is reduced at idling and under a low load, and a large amount of burned gas remains in the combustion chamber 18, and thus a combustion must be realized in the presence of such a large amount of remaining burned gas. The supplied fresh air and fuel will be made leaner by mixing with this large amount of remaining burned gas, resulting in difficulty in realizing the initial burning.

According to the present invention, as exemplified in FIG. 5, the exhaust valves 22 open at 80 degrees before the bottom dead center (BDC), where the piston 16 is moving downward fast, accompanying the decrease in the pressure in the combustion chamber 18 after a relatively weak blow down at idling or under a low load, thereby causing a positive back flow of exhaust gas due to the back pressure in the exhaust port 26 and the negative pressure in the combustion chamber 18. The exhaust valves 22 close at 40 degrees after the bottom dead center (BDC). The intake valves 20 open at a point after the opening of the exhaust valves 22 such that the back flow of the exhaust gas always occurs, for example, at 60 degrees before the bottom dead center (BDC), and close at 60 degrees after the bottom dead center (BDC) after the exhaust valves 22 are closed.

FIGS. 6A-6D explanatory of the generation of a swirl in the back flow of the exhaust gas, and the flow of fresh air stratified over the swirling and remaining exhaust gas, at idling and under a low load. In these conditions, the intake control valve 50 is closed and fresh air flows only through the low load intake valve (FA) 20. This fresh air flow is relatively slow and moderate, since the supply of fresh air is small in volume and the flow thereof from the low load intake valve (FA) 20 is not in a special direction, as illustrated with reference to FIG. 4A and 4B.

As shown in FIG. 6A the exhaust valves 22 open at 80 degrees before the bottom dead center (BDC), and exhaust gas is blown down relatively weakly at the pressure P. This blow down terminates after a short time at idling and under a low load. The pressure P in the exhaust ports 26, for example, instantaneously reaches 2 to 3 kilograms per square centimeter during the exhaust blow down, and decreases to 1.05 kilograms per square centimeter. Thereafter, this pressure level is stably maintained in the exhaust ports 26 to apply a positive back pressure toward the combustion chamber 18.

As shown of FIG. 6B, the pressure in the combustion chamber 18 becomes negative as the piston continues to move downward and exhaust gas flows back from the exhaust ports 26 into the combustion chamber 18, as shown by the arrow Q. This back flow of exhaust gas generates a swirl S in the combustion chamber 18 due to the provision of the swirl generating means, specifically comprising the mask wall 26a, the guide slope 64, and the disposition of the intake ports 26 and the exhaust ports 24. The low load intake valve (FA) 20 will open at 60 degrees before the bottom dead center (BDC). The flow of fresh air is regulated by the throttle valve 40 and delivered under pressure by the supercharger 42, the pressure level being relatively low at idling and under a low load. Further, a certain short time will pass from the start of the opening of the intake valve 20 to the actual full opening thereof, and thus the intake of fresh air is delayed to a certain degree and the back flow of and formation of the swirl of the exhaust gas will continuously occur even during the initial phase of opening of the intake valve 20. In this way, this exhaust gas swirl may continue for a fairly long time about the axis of the cylinder, or the combustion chamber 18, and be maintained by the last phase of the compression stroke without a substantial decrease therein.

Thereafter, fresh air will enter the combustion chamber 18 when the intake valve 10 is opened, as shown in of FIG. 6C. This fresh air flows slowly around the intake valve 20 under a relatively low charging pressure; as previously described with reference to FIG. 4A, and the speed of the downward movement of the piston 16 becomes reduced at this stage, near the BDC, and thus the formation of a negative pressure in the combustion chamber 18 will be mitigated. Therefore, fresh air enters the combustion chamber 18 slowly and moderately and settles quietly over the swirling exhaust gas, without a downward penetration of the exhaust gas. Rather, the flow of fresh air will form a swirl R, swirling together with the exhaust swirl S thereover and stratified therebetween. In this way, fresh air collects at the upper part of the combustion chamber 18 near the cylinder head 14 with the spark plug 28, and thus stratification is achieved between fresh air and exhaust gas, with fresh air near the cylinder head 14 and exhaust gas near the piston 14.

This stratification between fresh air and exhaust gas is maintained, as shown in of FIG. 6D, even after the piston 16 moves to the BDC and then moves upward, and the exhaust valve 22 is closed, and finally, the intake valve 20 is closed. Also, the exhaust ports 26 maintain a positive pressure level, which applies to a back pressure through the exhaust valves 22 to the combustion chamber 18 and the speed of the upward movement of the piston 16 is relatively low until the exhaust valves 22 close, so that a flowout, or blow-by, of fresh air from the combustion chamber 18 to the exhaust ports 26 is obstructed.

As described, to make the fresh air settle on the swirling exhaust gas and collect near the cylinder head 14, it is necessary for fresh air to flow slowly and moderately and thus avoid disturbing the swirl of exhaust gas. The supercharger 42 comprising a mechanical displacement blower, has a pulsating output, which may be thought to cause a small disturbance in the swirl of exhaust gas if directly introduced into the combustion chamber 18. It will be noted that the tank 46 serves to absorb fluctuations in the output of the supercharger 42 and to prevent any disturbance of the swirl of exhaust gas.

Accordingly, fresh air collects in the cylinder head 14 near the spark plug 28 and contains fuel therein which has been injected by the fuel injector 34 before the intake valves 20 were closed, and collects near the spark plug 28 without dispersal so as to make the air fuel ratio leaner. Therefore, it is possible to achieve a stable combustion because of an easy ignition of the mixture by the spark plug 28. Further, fresh air is superimposed on the burned gas and is activated by heat to become thermally activated with radical fuel components. Therefore, the mixture is ignited by the spark plug 28 even when the engine is cold, but after the completion of warming up, a self igniting combustion may be possible by adiabatic compression during the compression stroke. This can provide a good fuel economy and less exhaust pollution.

When the engine is under a relatively high load, the intake control valve 50 opens to enable fresh air to flow through both intake ports 24, especially, a large amount of fresh air can pass through the high load intake port 24. The high-load intake valve (FA) 20 is designed to allow fresh air to flows downward along the vertical wall of the combustion chamber 18, as described previously with reference to FIGS. 4A and 4B, and thus a large amount of fresh air can enter the combustion chamber 18 to provide a high power to the engine, by displacing exhaust gas with a high scavenging efficiency, while flowing downward along the wall of the cylinder on one side and being reflected at the piston to flow upward along the wall of the cylinder on the opposite side.

Also, when the engine is under a relatively high load, the tank control valve 48 for the tank 46 is closed to shut off the tank 46 from the common intake pipe 44. This means that supercharged fresh air is not used to increase the pressure in the tank 46 when transferring from a low load condition to a high load condition, but can be directly applied to increase the pressure of the flow of fresh air to deliver an increased amount of fresh air into the engine and thus obtain a good response upon acceleration.

As has been made clear, it is possible, according to the present invention, to establish a stratification between fresh air and remaining exhaust gas to effect a stable combustion at idling or under a low load and to obtain a good response under acceleration, and thus it is possible to obtain a two-stroke internal combustion engine which can realize a stable and good combustion even at idling and under a low load.

I claim:

1. A two-stroke internal combustion engine comprising:
    a cylinder block and a cylinder head mounted thereon to form a combustion chamber therein, said cylinder head having at least one intake port and at least one exhaust port formed therein, with an intake valve and an exhaust valve being arranged in said at least one intake port and said at least one exhaust port, respectively, for operation in synchronization with the engine to open and close the respective port;
    a fresh air intake passage means having an air charging means arranged therein for delivering fresh air under pressure to said at least one intake port;
    means for generating a swirl about an axis of said combustion chamber by a portion of exhaust gas caused to flow back from said at least one exhaust port into said combustion chamber after once being exhausted through said at least one exhaust port when said exhaust valve opens; and
    a tank means communicating with said fresh air intake passage means at a position downstream of said charging means.

2. An engine according to claim 1, wherein said charging means comprises a mechanical displacement pump.

3. An engine according to claim 2, wherein said mechanical displacement pump comprises a Roots type blower.

4. A two-stroke internal combustion engine comprising:
    a cylinder block and a cylinder head mounted thereon to form a combustion chamber therein, said cylinder head having at least one intake port and at least one exhaust port formed therein, with an intake valve and an exhaust valve being arranged in said at least one intake port and said at least one exhaust port, respectively, for operation in synchronization with the engine to open and close the respective port;
    a fresh air intake passage means having an air charging means arranged therein for delivering fresh air under pressure to said at least one intake port;
    means for generating a swirl about an axis of said combustion chamber by a portion of exhaust gas caused to flow back from said at least one exhaust port into said combustion chamber after once being exhausted through said at least one exhaust port when said exhaust valve opens;
    a tank means having a connection passage in communication with said fresh air intake passage means at a position downstream of said charging means; and
    a valve means arranged in said connection passage and closing said connection passage when the engine is under a relatively high load.

5. An engine according to claim 4, wherein said cylinder head has an inner wall having masking means provided at least partially around said at least one exhaust port to generate said swirl in said combustion chamber when said portion of exhaust gas flows back into said combustion chamber.

6. An engine according to claim 4, wherein a throttle valve is arranged upstream of said charging means.

7. An engine according to claim 4, wherein 9 fuel injector is arranged in said intake passage means.

8. An engine according to claim 4, wherein said charging means comprises a mechanical displacement pump.

9. An engine according to claim 8, wherein said mechanical displacement pump comprises a Roots type blower.

10. An engine according to claim 10, wherein a fuel injector is arranged in said at least one intake port.

11. An engine according to claim 10, wherein a check valve is arranged upstream of said fuel injector.

12. An engine according to claim 4, wherein said at least one intake port comprises first and second intake ports and said at least one exhaust port comprises first and second exhaust ports.

13. An engine according to claim 12, wherein said first exhaust port is connected to an exhaust pipe in generally linear relationship with said second exhaust port extending at a predetermined angle, whereby said portion of exhaust gas caused to flow back into said combustion chamber when said exhaust valve is open, primarily flows through said first exhaust port by inertia and generates said swirl in said combustion chamber, and a counter flow from said second intake port is obstructed by said intake control valve when the load of the engine is lower than said predetermined value.

14. An engine according to claim 12, wherein said first and second intake ports extend from one side of the engine in a side by side relationship and said first and second exhaust ports extend from the opposite side of the engine.

15. An engine according to claim 14, wherein said first exhaust port extends opposite to said second intake port and said second exhaust port extends opposite to said first intake port, said second exhaust port merging with said first exhaust port at a predetermined angle.

16. An engine according to claim 12, wherein said fresh air intake passage means comprises a first intake passage and a second intake passage for connection to said first and second intake ports, respectively, said first and second intake passages being connected to a common upstream intake passage, and said charging means and said tank connection passage being arranged in said common upstream intake passage.

17. An engine according to claim wherein an intake control valve is arranged in said second intake passage for operation in response to a load of the engine and closing said second intake passage when the load of the engine is lower than a predetermined value and opening said passage when the load is higher than said predetermined value.

* * * * *